United States Patent [19]

Dupont et al.

[11] Patent Number: 4,986,978
[45] Date of Patent: Jan. 22, 1991

[54] PROCESS FOR REFORMING IMPURE METHANOL

[75] Inventors: René Dupont, Douai; Guy Simonet, Paris, both of France

[73] Assignee: Societe Anonyme pour L'Etude et L'Exploitation des Procedes Georges Claude, Paris, France

[21] Appl. No.: 265,299

[22] Filed: Oct. 28, 1988

[30] Foreign Application Priority Data

Oct. 29, 1987 [FR] France .................. 87 15006

[51] Int. Cl.$^5$ .............................................. C01B 3/02
[52] U.S. Cl. .................. 423/648.1; 252/373; 422/235
[58] Field of Search ............ 423/648.1, 652; 252/373

[56] References Cited

U.S. PATENT DOCUMENTS 4,670,187 6/1987 Schurmans et al. ............ 252/373

FOREIGN PATENT DOCUMENTS 2490615 3/1982 France .
2572380 10/1984 France .

OTHER PUBLICATIONS

Kirk-Othmer, *Encyclopedia of Chemical Technology*, Third Edition, vol. 9 (1980), John Wiley & Sons, pp. 338, 339.
John H. Perry, *Chemical Engineers' Handbook*, Fourth Edition (1963), McGraw-Hill Book Company, pp. 9-7, 9-8, 9-22.

*Primary Examiner*—Wayne A. Langel
*Attorney, Agent, or Firm*—Browdy and Neimark

[57] ABSTRACT

A method and apparatus are provided for reforming impure methanol wherein residual gas produced during the reforming reaction is combusted simultaneously with residual gas coming from the purification of the hydrogen produced. The apparatus includes a tubular reactor in which the steam reforming is performed, a vaporizer for the reaction mixture, a heat exchanger to exchange heat between the outgoing gases and the feed liquid, a separator, a purification unit, and a combustion furnace for the residual purification gas. The apparatus further comprises a pipe for bringing in the condensed water-alcohol mixture to the combustion furnace, this pipe being equipped with two heat exchangers.

2 Claims, 1 Drawing Sheet

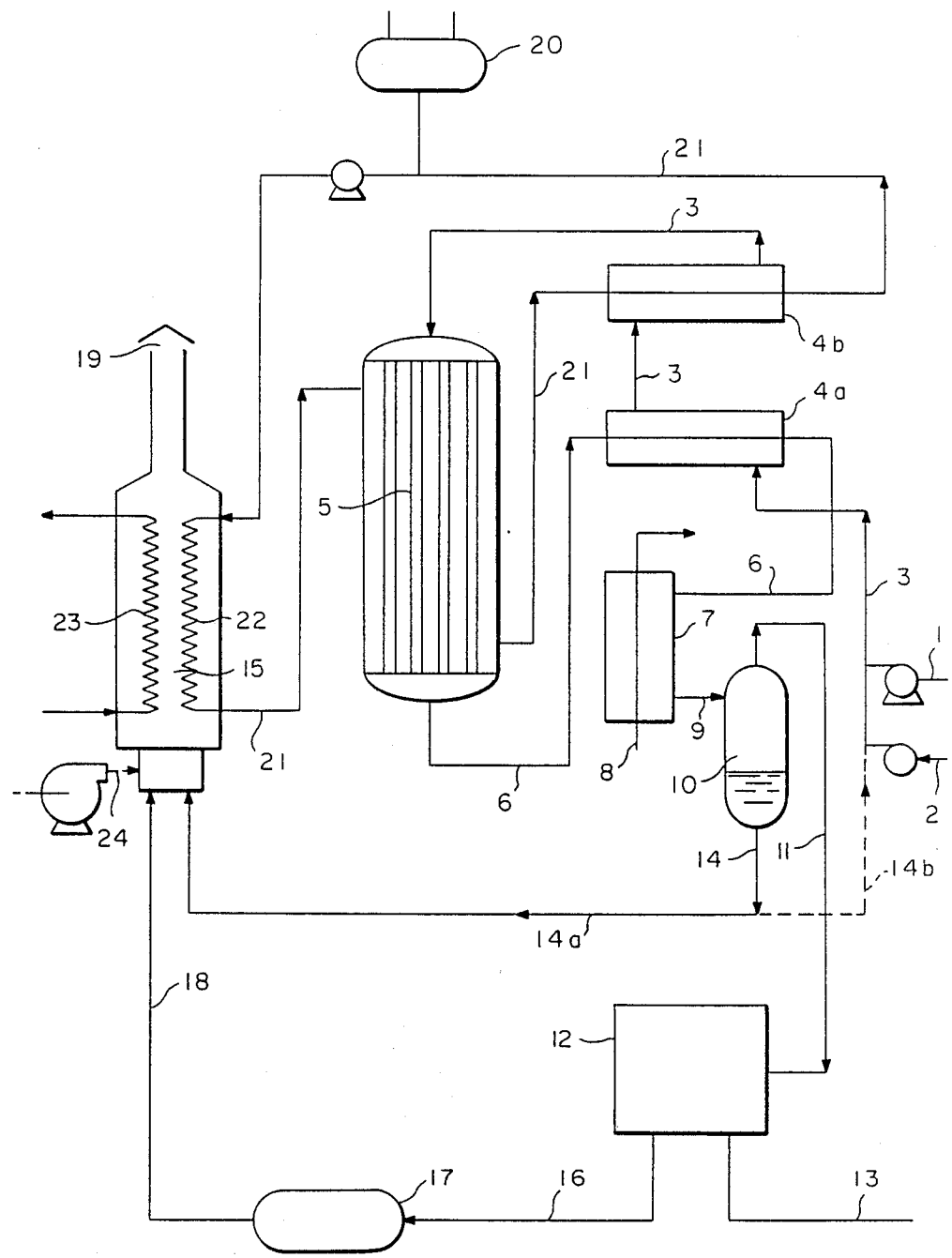

PROCESS FOR REFORMING IMPURE METHANOL

FIELD OF THE INVENTION

This present invention relates to a process and apparatus for reforming impure methanol.

BACKGROUND OF THE INVENTION

The methanol cut, produced either by a cracking or steam reforming processes, can produce gas mixtures of markedly different compositions. Both the suitable choice of catalysts and the operating conditions determine in great part the composition of the resulting gas flow.

The use of methanol as a source in production of hydrogen, although very well known, has been considered to be rather disadvantageous, especially with regard to economics. However, the decreasing availability of hydrocarbons, as well as gasification of coal, tend to change this situation.

Existing techniques have already been improved and adapted to achieve an optimal use of methanol as the initial hydrocarbon for production of gas with varied compositions.

The technique of steam reforming seems particularly well suited to the production of hydrogen, a part of the introduced water being transformed into hydrogen; and under conditions of low-temperature use it is advisable to resort to a catalyst not having any activity in regard to methanization.

A process is known from French patent No. 2,490,615 for reforming methanol to obtain gas containing variable concentrations of hydrogen and carbon monoxide, the balance of the gas being made up of carbon dioxide, methane, steam and optionally nitrogen, according to to which an operation is performed of cracking mixtures in variable portions of steam and methanol vapor, in the presence optionally of nitrogen or air and gas which are recycled, after optional separation of certain components and gas coming from outside the unit. This process used in several stages makes it possible to produce pure hydrogen.

In stage a) heating and vaporization is performed at the required pressure, for example 20 bars, of the adjusted methanol- water feed mixture.

Then in stage b), reforming, on suitable catalyst, of the methanol-water mixture is performed at a temperature of about 300° C.

This operation is performed according to two simultaneous reactions in equilibrium, which together constitute the reforming:

Decomposition of methanol:

$$CH_3OH \rightleftharpoons CO + 2H_2$$

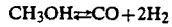

Conversion of carbon monoxide:

$$CO + H_2O \rightleftharpoons CO_2 + H_2$$

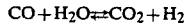

These two reactions can be performed either on a single catalyst or on two catalysts.

The gas obtained at the output of the reforming process, at 300° C., has the following approximate composition, expressed in molar percentage, for a ratio $CH_3OH/H_2O = 0.5$ at the input of the reactor: hydrogen ($H_2$)=about 55.2%, carbon dioxide ($CO_2$)= about 17.8%, carbon monoxide (CO)=about 0.9%, water ($H_2O$)=about 26.1%, with traces of methane or methanol.

In stage c) the reformed gas is cooled to ambient temperature with condensation of water.

After cooling, under 20 bars for example, the composition of the mixture is the following: $H_2$=about 74.3%, $CO_2$=about 24.0%, CO=about 1.2%, $H_2O$=about 0.5%, with trace of methane and methanol.

Then in last stage d), purification of the gas mixture is performed on a molecular sieve. This process is advantageous in combination with steam reforming of methanol, particularly for production of very pure hydrogen.

Purification of the gas mixture under said pressure by adsorption of gases other than hydrogen in a unit of the "Pressure Swing Adsorption," PSA, type unit, makes it possible, on the one hand, to obtain a very pure hydrogen fraction under pressure, constituting the product of the reforming unit and, on the other hand, a so-called "residual gas" fraction available at reduced pressure and whose typical composition expressed by volume is the following: $H_2$=about 47%, $CO_2$=about 48.2%, CO=about 3.4%, $H_2O$=about 1.2%, $CH_4$=about 0.2%.

According to the process treating practically pure methanol, the water condensed during phase c) is recycled at the input of the unit. The heat necessary for the reforming is generally obtained by heating with a heat-exchanging fluid at about 320° C., in a combustion zone, where the residual gas fraction is burned. This heat-exchanging fluid is then the object of a heat exchange with the catalytic reforming zone, the catalyst tubes, on the one hand,—isothermal type reforming—and with the gas mixture to be reformed, on the other hand, particularly to assure its vaporization.

The above described process leads to very good results from practically pure methanol. In case the methanol contains a certain number of impurities consisting of alcohol heavier than methanol, and if the usual operating conditions of the catalyst are maintained, i.e., at a temperature of about 300° C., the impurities of the methanol react only very little on the catalyst, on the one hand, and reduce the yield of reforming of the methanol, on the other hand. Consequently, there is an enrichment of the condensed water, in phase c), with methanol and various alcohols. This enrichment is in relation to the water/methanol ratio of the gas mixture entering on the catalyst. The following table gives some experimental values.

| Composition of condensed liquid (% by weight) | $H_2O/CH_3OH$ | |
|---|---|---|
| | 1.75 | 1.5 |
| Water | 80.5 | 73.45 |
| Methanol | 15.6 | 22.00 |
| Ethanol | 1.15 | 1.35 |
| Isopropanol | 0.80 | 0.90 |
| Propanol | 1.05 | 1.20 |
| Butanol | 0.90 | 1.10 |

An improved reforming process has been sought making it possible to treat methanol containing impurities consisting mainly of ethanol, isopropanol, propanol, butanol, various fatty alcohols, etc. . . . while reducing the drawbacks inherent in the process described above.

SUMMARY OF THE INVENTION

According to the present invention, in a process of reforming impure methanol containing alcohols higher than methanol, in which the heat input is made by a heat-exchanging fluid heated by the residual gas from a purification of gas produced by reforming, to obtain hydrogen, a simultaneous combustion is performed of the condensed water-alcohol mixture coming from cooling the reformed gas to ambient temperature, and of the residual gas coming from purification of hydrogen.

The simultaneous combustion of the condensed-vaporized mixture and of the residual gas of hydrogen purification offers numerous advantages.

It makes possible incineration of a liquid having only a relatively low content of methanol and various alcohols, therefore obtaining a better reforming yield of impure methanol.

This simultaneous combustion avoids any particular zone of incineration of the liquid, this incineration being performed in the combustion zone of the residual gas to provide the heat useful for reforming methanol.

Moreover, recovery of the heat belonging to combustion of the purged liquid flow can be done economically, requiring only a simple additional means of heat recovery in the zone of combustion of the residual gas (production of steam, for example).

Additionally, incineration of the liquid water-alcohol mixture in the zone of combustion of the residual mixture avoids any environmental problem linked to discharge of such a liquid mixture.

Depending on the type of operation, the simultaneous combustion of the so-called purged condensed liquid, water- alcohols and residual purification gas, makes possible the recovery of an available amount of heat exceeding the actual needs of the process itself.

According to a variation of this process, other vaporizable liquids are introduced into the purged water-alcohol liquid, and, after vaporization, the mixture is subjected to a simultaneous combustion with the residual purification gas. This operating condition makes possible an increase of heat recovery.

There can advantageously be used in combination, the mixed combustion of the condensed water-alcohol mixture and the residual purification gas with recycling into the zone of reforming a fraction of said condensed mixture, said recycled fraction being added to the feed flow: methanol and water, before vaporization by heat exchange with the gas leaving the reactor. Depending on the case, it is possible to obtain a heat autonomy of the process without excess of available heat.

The ratio of the proportions between the fraction of condensed water-alcohol mixture sent to combustion and the mixture fraction recycled to reforming is adjusted as a function of the impurities of the methanol to be treated, so as to obtain the best possible compromise between the important economic factors of the process, namely, the reforming yield of the methanol and the life of the catalyst, directly linked to the reforming temperature.

The reforming temperature is generally higher the greater the recycled condensed liquid fraction; the working conditions of the catalyst then being more severe.

An important advantage of this invention consists in maintaining the reforming reaction temperature at about 300° C., a much lower temperature than what would be necessary to treat impure methanol in the adiabatic process described in the first certificate of addition FR 2,572,380 (U.S. Pat. No. 4,670,187).

BRIEF DESCRIPTION OF THE DRAWING

Steam reforming of impure methanol can be performed in an apparatus of the type represented in the accompanying figure.

DETAILED DESCRIPTION OF THE INVENTION

This apparatus essentially comprises a tubular reactor, in which the steam reforming is performed, a reaction mixture vaporizer, and a heat exchanger between the outgoing gases and the feed flow, a condenser, a purification unit to obtain pure hydrogen, a combustion furnace equipped with two tube banks and a recycling circuit.

The feed liquids, methanol and water, introduced at (1) and (2) after mixing and circulating in pipe (3), are heated and partially evaporated in heat exchanger (4a) by heat exchange with the gas leaving reactor (5) and circulating in pipe (6), and the reaction mixture is preheated in a vaporizer (4b). After vaporization and heating at the required temperature, the reaction mixture circulates in the tubes charged with catalyst of reactor (5) where the reactions of reforming methanol and of equilibrium $CO + H_2O \rightleftharpoons CO_2 + H_2$ take place. The gas mixture resulting from these reactions and leaving the reactor (wet gas) is first cooled in exchanger (4a) countercurrent to the liquid to be treated.

Said wet gas leaving exchanger (4a) is then cooled in cooler-condenser (7) with circulation of water (8) before going by (9) into separator (10), then the gas mixture leaves the upper part of the separator by pipe (11) before going into purification unit (12), pure hydrogen leaving the installation at (13). The condensed water-alcohol mixture liquid is removed from separator (10) to pipe (14) before being introduced into combustion furnace (15). The residual gas leaves the purification apparatus by pipe (16), and is accumulated in buffer tank (17) before circulating by (18) to combustion furnace (15) to be burned there simultaneously with the water-alcohol mixture. The fumes escape at (19), while the heat is recovered, on the one hand, by the heat-exchanging fluid coming from tank (20) and circulating in loop (21), between combustion furnace (15) in heat exchange device (22), located in said furnace, reactor (5) and vaporizer (4b) and, on the other hand, in an additional heat exchanger device (23) also located in combustion furnace (15). Air or oxygen are brought to the furnace burner, after compression, by pipe (24).

According to an embodiment, the condensed water-alcohol mixture, removed by pipe (14), is separated into two fractions, in this case a fraction (14a), as above, is introduced into combustion furnace (15) and fraction (14b) is recycled in the methanol-water feed mixture in pipe (3).

According to another embodiment, not shown, in the case where the methanol contains heavy impurities, the standard apparatus comprising a methanol pump and a water pump, the mixing being done during delivery of the pump is replaced by the following device:

water + impure methanol mixing in a tank at atmospheric pressure (according to the proportion required by the process);

filtering of the mixture after a suitable time (from a few hours to a few dozen hours) on a special filter to separate the solid phase forming in said tank.

The filtered liquid is collected in a second tank at atmospheric pressure from which a pump feeds the reforming unit at the desired pressure.

The means described above have been used in a prototype unit, and the results obtained are given in the following table:

| Heavy impurities content in treated $CH_3OH$ % by weight | Rate of recycling of liquid condensate % | Reforming temperature °C. | $H_2$ yield produced during reforming per kg of $CH_3OH$ consumed $Nm^3H_2/kg$ |
| --- | --- | --- | --- |
| 2.45 | 0 | 284 | 1.79 |
| 5.40 | 57 | 287 | 1.88 |
| 8.50 | 75 | 291 | 1.92 |
| 9.70 | 85 | 293 | 1.95 |

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A process for reforming impure methanol to produce pure hydrogen, wherein aid methanol contains alcohols higher than methanol, comprising:

heating and vaporizing a mixture of feed water and impure methanol;

reforming said vaporized mixture of water and impure methanol at a temperature of about 300° C., whereby a reformed gas is produced;

cooling said reformed gas to produce a gas of impure hydrogen, a condensed methanol and higher alcohols - water mixture;

purifying said gas of impure hydrogen so as to produce pure hydrogen and a residual gas;

recycling a part of said condensed methanol and higher alcohols - water mixture with the feed liquid water and impure methanol; and performing a simultaneous combustion of said residual gas and remaining non-cycled parts of said condensed methanol and higher alcohols-water mixture;

said vaporizing of said mixture of water and impure methanol being effected with heat exchange by recovering a part of said combustion heat after use of same as reforming heat.

2. The process according to claim 1 wherein the rate of recycled condensate methanol and higher alcohols-water mixture is increased as the content of impurities in methanol is increased and such that, when said rate is from about 57% to 85%, the impurities are from about 5.40% to 9.70%.

* * * * *